(12) United States Patent
Walsh, III et al.

(10) Patent No.: US 10,295,260 B2
(45) Date of Patent: May 21, 2019

(54) CERAMIC LINER AND METHOD OF FORMING

(71) Applicant: SAINT-GOBAIN CERAMICS & PLASTICS, INC., Worcester, MA (US)

(72) Inventors: John Carl Walsh, III, Saratoga Springs, NY (US); Michael P. Schnelzer, Cincinnati, OH (US); Edmund A. Cortellini, North Brookfield, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/787,573

(22) Filed: Oct. 18, 2017

(65) Prior Publication Data

US 2018/0106547 A1    Apr. 19, 2018

Related U.S. Application Data

(60) Provisional application No. 62/409,458, filed on Oct. 18, 2016.

(51) Int. Cl.
    *F27D 1/10*    (2006.01)
    *F27D 1/16*    (2006.01)
    (Continued)

(52) U.S. Cl.
    CPC ............... *F27D 1/10* (2013.01); *C04B 35/04* (2013.01); *C04B 35/10* (2013.01); *C04B 35/66* (2013.01);
    (Continued)

(58) Field of Classification Search
    CPC ............. F27D 1/10; F27D 1/16; F27D 1/1626
    (Continued)

(56) References Cited

U.S. PATENT DOCUMENTS 2,755,192 A    7/1956    Mahoney
2,757,219 A    7/1956    Clough et al.
(Continued)

FOREIGN PATENT DOCUMENTS

DE    2512841 A1    9/1976
EP    0069094 A1    1/1983
(Continued)

OTHER PUBLICATIONS

"Refractory Engineering: Materials—Design—Construction," pp. 312-314, 2005, Vulkan-Verlag GMBH.
(Continued)

*Primary Examiner* — Erin Snelting
(74) *Attorney, Agent, or Firm* — Abel Law Group, LLP; Alex Plache

(57) ABSTRACT

A ceramic liner can include a monolithic body having a surface portion and a bulk portion. The surface portion can have a thickness less than the total thickness of the monolithic body. The monolithic body can include an amorphous phase. The amorphous phase can be discontinuous. At least one member of the discontinuous phase can be embedded in the surface portion. The bulk portion can be substantially free of the amorphous phase. A method of forming a ceramic liner can include providing a furnace with a coating and a bulk material of the ceramic liner and heating the bulk material and the coating. In an embodiment, a coated lining form can be used to provide the coating. In a particular embodiment, the coating can be transferred to the bulk material from the coated lining form.

13 Claims, 4 Drawing Sheets

(51) Int. Cl.
*C04B 35/04* (2006.01)
*C04B 35/10* (2006.01)
*C04B 35/66* (2006.01)

(52) U.S. Cl.
CPC ........ *F27D 1/16* (2013.01); *C04B 2235/3201* (2013.01); *C04B 2235/3217* (2013.01); *C04B 2235/3418* (2013.01); *C04B 2235/365* (2013.01); *C04B 2235/80* (2013.01)

(58) Field of Classification Search
USPC .......................................................... 264/30
See application file for complete search history.

(56) References Cited

U.S. PATENT DOCUMENTS

| | | | |
|---|---|---|---|
| 3,492,383 | A | 1/1970 | Heimgartner |
| 3,820,978 | A | 6/1974 | Magoteaux |
| 3,836,613 | A | 9/1974 | Granitzki et al. |
| 3,916,047 | A | 10/1975 | Niesen |
| 4,049,759 | A | 9/1977 | Florian |
| 4,317,851 | A | 3/1982 | Neser |
| 4,442,050 | A | 4/1984 | Takuo |
| 4,683,151 | A | 7/1987 | Amaguchi et al. |
| 5,134,629 | A | 7/1992 | Cullan |
| 5,495,495 | A | 2/1996 | Cullan |
| 2004/0157725 | A1* | 8/2004 | Doza ............................ 501/95.1 |
| 2005/0254543 | A1 | 11/2005 | Daimer |
| 2013/0090228 | A1 | 4/2013 | Reilly |
| 2013/0189493 | A1* | 7/2013 | Decker ......................... 428/172 |
| 2014/0150986 | A1* | 6/2014 | Dewlay ......................... 164/131 |

FOREIGN PATENT DOCUMENTS

| | | |
|---|---|---|
| EP | 0119812 A2 | 9/1984 |
| WO | 2014-092753 A1 | 6/2014 |

OTHER PUBLICATIONS

Meredith, Jeff, "Induction Furnaces," 2 pages, Atlas Foundry Company, accessed May 30, 2016. http://www.atlasfdry.com/inductionfurnaces.htm.

"Use of Silica Ramming Mass in Induction Furnaces," 17 pages, Raghav Productivity Enhancers Ltd. http://www.premixrammingmass.net/fm/1116159/silica_ramming_mass.pdf.

International Search Report and Written Opinion dated Jan. 24, 2018, with regard to International Application No. PCT/US2017/057250.

* cited by examiner

CERAMIC LINER AND METHOD OF FORMING

CROSS-REFERENCE TO RELATED APPLICATION(S)

This application claims priority under 35 U.S.C. § 119(e) to U.S. Provisional Patent Application No. 62/409,458, filed Oct. 18, 2016, entitled "CERAMIC LINER AND METHOD OF FORMING," by John Carl WALSH, et al., which is assigned to the current assignee hereof and incorporated herein by reference in its entirety.

FIELD OF THE DISCLOSURE

The present application relates, in general, to ceramic liners and method of forming.

BACKGROUND

The inside wall of a foundry furnace is typically lined with a refractory material to prevent damage to furnace parts caused by extreme heat, such as 1,200° C. to 1,600° C., used to melt metal. The liner of a furnace also functions as an insulating layer to prevent heat loss and improve furnace efficiency in maintaining operation temperatures. Installation of a furnace liner generally involves a lining form that can be made of metal or other suitable materials. A metal form is often kept in a furnace after a lining mix is installed and allowed to melt in heat applied to sinter the lining mix. As needed, the residual metal from the form can be washed out by running an additional heat cycle prior to an operation of melting metal, which, however, reduces the total number of heat cycles a furnace can run. In some instances, sintering aids are used in lining mixes to allow sintering to be completed at lower temperatures and removal of metal forms prior to melting metals. However, use of sintering aids renders liners less refractory and significantly shortens service lives of liners. The industry continues to demand improvement in foundry furnaces.

BRIEF DESCRIPTION OF THE DRAWINGS

Embodiments are illustrated by way of example and are not limited in the accompanying figures.

Figure 1:
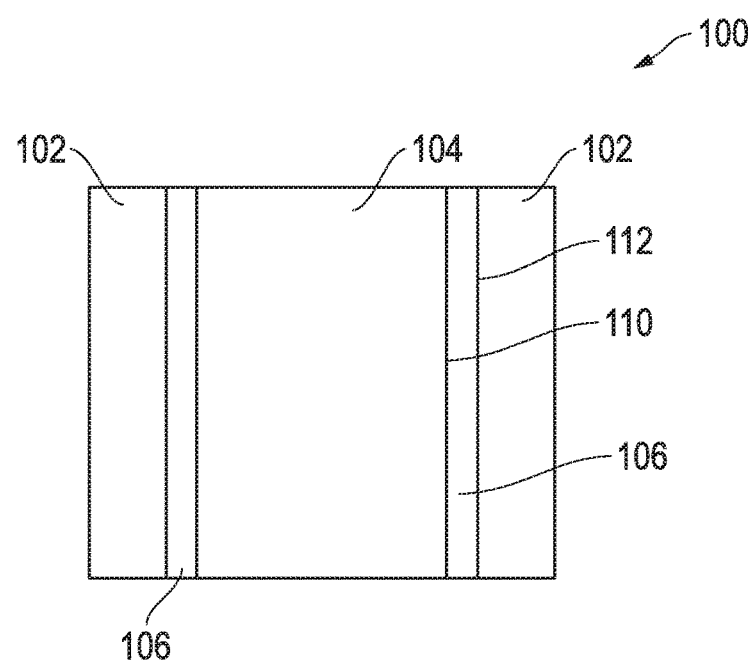
FIG. 1 includes an illustration of a cross-sectional view of a portion of a furnace in accordance with an embodiment herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

As used herein, a material or body being substantially free of a certain element is intended to mean that the material or body may contain that certain element in an impurity content or trace amount that does not materially affect the properties of the material or body. For example, such impurity content or trace amount may be not greater than 0.1 wt %.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments are related to a furnace ceramic liner having a monolithic body. The body includes a surface portion and a bulk portion. The surface portion includes a discontinuous amorphous phase. The discontinuous amorphous phase allows the surface portion to sinter at a temperature lower than the melting temperature of a lining form used to install the ceramic liner, which allows the lining form to be removed as desired prior to applying heat to sinter the bulk portion. Further, the discontinuous amorphous phase can help to prevent initial metal saturation of the liner and extend its service life. In a particular embodiment, the bulk portion can be substantially free of the discontinuous amorphous phase. Localized distribution of the discontinuous amorphous phase helps to limit potentially adverse effect of the amorphous phase on property of the ceramic liner.

Further embodiments are related to methods of forming a ceramic liner including a bulk material. Methods include providing a coating on the bulk material and applying heat to the coating and the bulk material to form a ceramic liner including a discontinuous amorphous phase. In a particular embodiment, the coating is provided by utilizing a coated lining form and applying heat to transfer at least a portion of the coating from the form to the bulk material. The methods may allow a majority of the coating to be transferred to the surface portion of the liner so that the surface portion can be sintered at a lower temperature and provide rigidity to reduce the likelihood that the liner will collapse after the lining form is removed. Furthermore, the surface portion can be rigid enough to take impact of incoming charge metal, and thus, sintering the bulk portion of the liner prior to charging the furnace may not be necessary, which helps to improve efficiency of the furnace.

The ceramic liner and methods of embodiments herein can be applied in foundry furnaces, such as induction furnaces and other furnaces utilized in melting metals, and may be particularly suitable for coreless induction furnaces and channel induction furnaces.

In an embodiment, the ceramic liner can include a bulk material that can withstand extreme heat (e.g., a metal melting temperature) without significant degradation. For instance, the bulk material can include a refractory material including alumina and magnesia. In another embodiment, the bulk material can include a chrome-based refractory material. In a particular embodiment, the bulk material can include a spinel, such as a magnesium rich spinel, an aluminum rich spinel, or a combination thereof. In a further embodiment, the bulk material may not include an element that may be a contaminant to metal production. For instance, when melting a superalloy, the bulk material may not contain an undesired metal, such as Ti, Ni, Co, or other metal that may contaminate the superalloy. In instances when incorporating a metal element from a liner is acceptable for metal production, the bulk material can include that metal element. For example, a chrome-based refractory material may be used in a liner of a furnace for melting certain alloys containing chrome. A skilled artisan would understand various bulk materials can be suitably applied in embodiments herein and be able to select a suitable bulk material for a particular application after reading this disclosure. In a particular embodiment, the bulk material can be substantially free of a sintering aid.

In an embodiment, the ceramic liner can include a monolithic body having an inner surface and an outer surface. FIG. 1 includes an illustration of a cross-sectional view of a portion of a furnace 100. A furnace wall 102 is lined with a liner 106 having an inner surface 110 facing a cavity 104 and an outer surface 112 that faces away from the cavity 104 and abuts the wall 102. In another embodiment, the outer surface can be more adjacent than the inner surface to the furnace wall defining a cavity but still distanced away from the wall (not illustrated).

Figure 2:
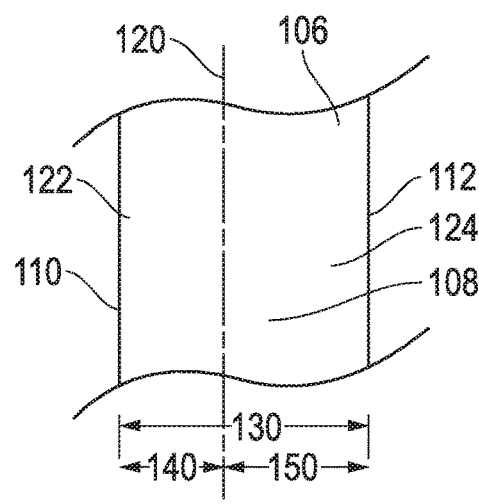
FIG. 2 includes an illustration of an enlarged cross-sectional view of a portion of a liner in accordance with an embodiment herein.

In an embodiment, the monolithic body can have a total thickness that is measured as the distance between the inner surface and outer surface. FIG. 2 includes an illustration of an enlarged view of a portion of a liner 106. In FIG. 2, the liner 106 has a monolithic body 108 including an inner surface 110, an outer surface 112, and a total thickness 130. The total thickness of the monolithic body may vary significantly according to requirements of different furnaces. In an embodiment, the monolithic body can have a total thickness of at least 75 mm to reduce heat loss and damage to other parts of a furnace. In another embodiment, the total thickness may be at least 110 mm or at least 140 mm to improve furnace efficiency in maintaining operation temperatures. In another embodiment, the monolithic body can have a total thickness of at most 840 mm, at most 670 mm, or at most 520 mm, which may help to reduce heating time required to reach the maximum operation temperature and improve furnace efficiency. The total thickness may also be affected by the design or capacity of a furnace. In a further embodiment, the monolithic body can have a total thickness in a range including any of the minimum and maximum values noted herein. A skilled artisan would understand in some instances, total thickness of monolithic bodies may be different than thickness noted above in order to meet requirement of certain furnaces.

In a further embodiment, the monolithic body can include a surface portion and a bulk portion. As illustrated in FIG. 2, the body 108 includes a surface portion 122 and a bulk portion 124. A dashed line 120 is illustrated in FIG. 2 to aid understanding of portions of the body 108. The surface portion 122 can include the inner surface 110 and have a thickness 140. The bulk portion 124 can include the outer surface 112 and have a thickness 150.

In an embodiment, the surface portion can have a thickness at most 90% of the total thickness of the monolithic body. In another embodiment, the surface portion can have a thickness at most 50%, at most 30% or at most 15% of the total thickness of the monolithic body to facilitate improved refractory property of the ceramic liner. In another embodiment, the surface portion can have a thickness of at least 0.2% of the total thickness of the monolithic body, such as at least 1%, at least 2.5%, or at least 5% of the total thickness of the monolithic body. A relatively thicker surface portion may help to improve rigidity of the ceramic liner to take impact from the upcoming charge. The surface portion can have a thickness in a range including any of the minimum and maximum percentages noted above. For example, the surface portion can have a thickness in a range including at least 0.2% and at most 50% of the total thickness of the monolithic body, such as in a range including at least 1% and at most 15% of the total thickness of the monolithic body.

In an embodiment, the surface portion can have a thickness at most 40 mm, such as at most 25 mm or at most 16 mm to facilitate improved refractory property of the ceramic liner. In another embodiment, the surface portion can have a thickness of at least 4 mm to provide sufficient rigidity to the ceramic liner, such as at least 8 mm or at least 11 mm. The surface portion can have a thickness including any of the minimum and maximum values noted above. For instance, the surface portion can have a thickness in a range including at least 4 mm and at most 40 mm.

Thickness of the bulk portion may vary in different furnaces and can be affected as the total thickness of the monolithic body, thickness of the surface portion, or both change. In an embodiment, the bulk portion can have a thickness of at least 16 mm and at most 830 mm to facilitate improved furnace efficiency and refractory property of the ceramic liner. A skilled artisan would understand the bulk portion can have a thickness other than values noted above, because the total thickness of the monolithic body can vary significantly to be suitable for various furnaces. In a particular embodiment, the bulk portion can have a thickness greater than the thickness of the surface portion. In another particular embodiment, the total thickness of the monolithic body is the total of the thickness of the surface portion and the thickness of the bulk portion.

In an embodiment, the monolithic body can include an amorphous phase. The amorphous phase can be present at a certain content to facilitate formation of the ceramic liner. In an embodiment, the monolithic body can include at least 1.6 wt % of the amorphous phase relative to a total weight of the bulk material to allow the surface portion to sinter at a lower temperature. In instances sintering reactions at greater depth are desired, higher contents of the amorphous phase may be included. For instance, a content of the amorphous phase can be at least 2.1 wt % or at least 3.1 wt %. In another embodiment, the monolithic body can include at most 5.2 wt %, at most 4.2 wt % or at most 3.5 wt % of the amorphous phase relative to a total weight of the bulk material to reduce the likelihood of potential impact of the amorphous phase on liner property. In a further embodiment, the content of the amorphous phase can be in a range including any of the minimum and maximum percentages disclosed herein. For instance, the monolithic body can include a content of the amorphous phase in a range including at least 2.1 wt % and at most 5.2 wt % relative to the total weight of the bulk material.

In another embodiment, the monolithic body can have at most 15 vol % of the amorphous phase for a total volume of the body. In a particular embodiment, the monolithic body can include at most 11 vol % or at most 6 vol % of the amorphous phase for a total volume of the body. In another embodiment, the monolithic body can include at least 0.2 vol % of the amorphous phase, such as at least 1 vol % or at least 2.5 vol of the amorphous phase. The monolithic body can include a content of the amorphous phase in a range including at least 0.2 vol % and at most 15 vol % for a total volume of the body, such as in a range including at least 2.5 vol % and at most 6 vol % for a total volume of the body.

In an embodiment, the amorphous phase can be discontinuous, and members of the amorphous phase can be separated from one another by the bulk material. In a further embodiment, the discontinuous amorphous phase can reside in the surface portion. Particularly, at least 50%, at least 70%, or at least 80% of the discontinuous amorphous phase can reside within the surface portion of the monolithic body, which may help to reduce potential adverse effect on overall liner property. In a more particular embodiment, at least 90% of the discontinuous amorphous phase can reside within the surface portion. In another more particular embodiment, the bulk portion can be substantially free of the discontinuous amorphous phase.

In a further embodiment, at least one member of the discontinuous amorphous phase can be spaced apart from the inner surface of the monolithic body. In another embodiment, at least one member of the discontinuous amorphous phase can be embedded within the surface portion of the monolithic body. In still another embodiment, the discontinuous amorphous phase can be outlined by the grain boundaries surrounding each discrete member.

Figure 3:
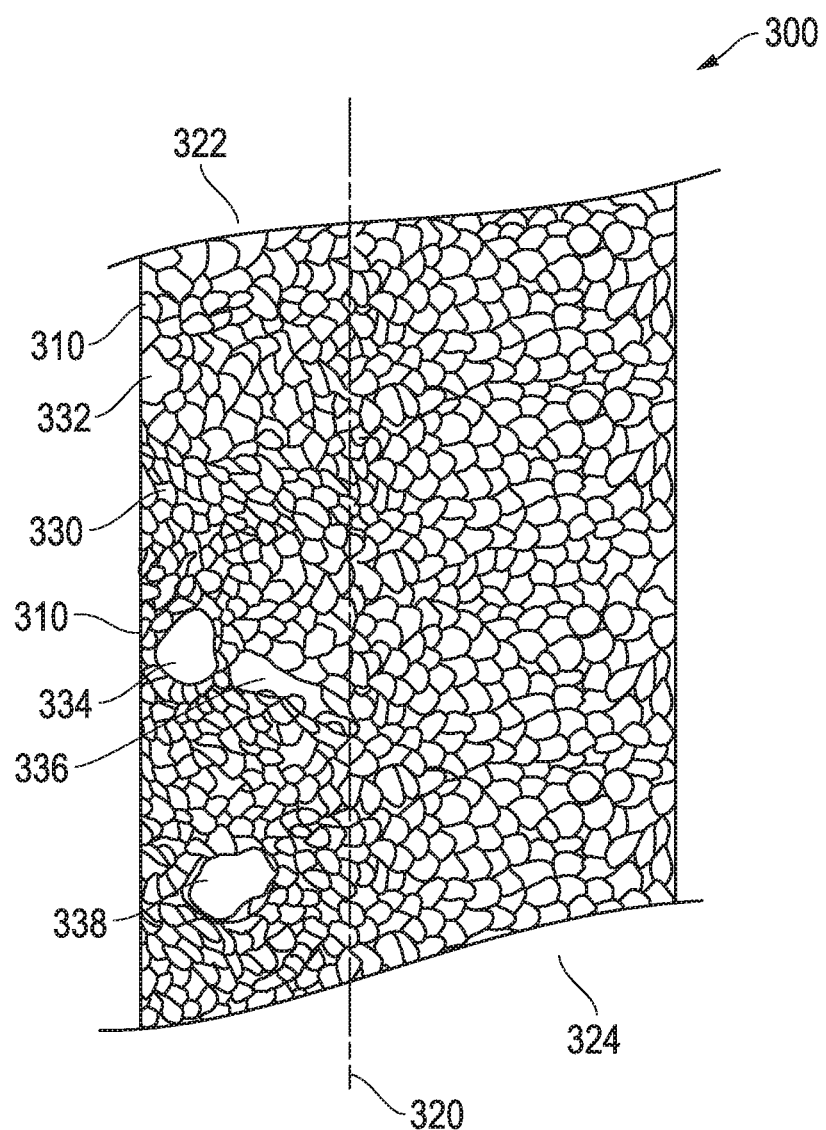
FIG. 3 includes an illustration of a cross-sectional view of a portion of a liner in accordance with an embodiment herein.

FIG. 3 includes an illustration of a discontinuous amorphous phase in the monolithic body of a liner 300. Exemplary members 332, 334, 336, and 338 of a discontinuous phase are illustrated and separated from one another by grains like the grain 330 of the bulk material. An artificial line 320 is included to aid understanding of the locations of the surface portion 322 and the bulk portion 324. As illustrated, the members 334, 336, and 338 are spaced apart from the inner surface 310 and embedded within the surface portion 322.

In an embodiment, the amorphous phase can include a heat induced reaction product of an alkali solution and an acidic solution. An exemplary alkali solution can include a silicate, such as a silicate including a Group I or Group 2 element of the IUPAC Periodic Table of the Elements (dated Jan. 8, 2016). In a particular embodiment, the alkali solution can include sodium silicate, potassium silicate, or a combination thereof. In an illustrative exemplary application, the alkali solution can be a sodium silicate solution including $Na_2O$ and $SiO_2$. In a particular application, the sodium silicate solution can include $Na_2O$ in a concentration of 5 wt % to 12 wt % relative to the total weight of the solution and $SiO_2$ in a concentration of 18 wt % to 35 wt % relative to the total weight, and water as the solvent.

An example of an acidic solution can include citric acid, boric acid, aluminum phosphate, aluminum fluoride, cryolite, or any combination thereof. In a particular embodiment, the acidic solution can include citric acid. In another particular embodiment, the acidic solution can include boric acid. In a further embodiment, the acidic solution can include an oxide including a metal oxide, a non-metal oxide, or both to enhance strength of the reaction product. An example of the metal oxide can include $Na_2O$, $CaO$, $Al_2O_3$, $MgO$, $Fe_2O_3$, $K_2O$, or a combination thereof. An example of the non-metal oxide can include an oxide of silicon, such as $SiO_2$. In a particular embodiment, the acidic solution can include $Al_2O_3$, $SiO_2$, and boric acid. In some instances, clay can be included in the acidic solution to provide the suitable oxide, such as kaolinite, montmorillonite-smectite, illite, chlorite, or any combination thereof. In further embodiment, additives may be added to the acidic solution, alkali solution, or both to aid preparation of the solutions. For example, an additive can include a de-foaming agent, a dispersant, or the like. An exemplary de-foaming agent can include sodium lignosulfonate, lignofulfonate, calcium lignosulfonate, or any combination thereof. A dispersant can include polyethylene glycol, polyacid, polycarboxylates, or any combination thereof. The alkali and acidic solution may be selected to be suitable for the particular metal production a furnace is used for. For instance, boron may be a contaminant for certain superalloy production, and accordingly, boric acid may be avoided in forming the amorphous phase in those applications.

In an embodiment, the alkali and acidic solutions can be prepared separately, each utilizing $H_2O$ as a solvent. In an embodiment, the alkali solution can include 25 wt % to 35 wt % of the silicate for a total weight of the alkali solution. In another embodiment, the acidic solution can include 40 wt % to 80 wt % of boric acid, 1 wt % to 30 wt % of citric acid, 5 wt % to 75 wt % of cryolite, 5 wt % to 35 wt % of aluminum phosphate for a total weight of the acidic solution. In a further embodiment, the acidic solution can include the oxide at a concentration of 5 wt % to 60 wt % for a total weight of the acidic solution. In some instances, clay can be used in the acidic solution to provide one or more oxides that are desired by certain applications, for instance, at a concentration of 5 wt % to 60 wt %. In another embodiment, the additive may be included in a content of not greater than 25 wt % for the total weight of the solution, in which it is included.

In an embodiment, the amorphous phase can include a sintering aid. In a particular embodiment, the amorphous phase can include a silica, a borate, or a combination thereof. More particularly, the amorphous phase can include a borosilicate. In another particular embodiment, the amorphous phase can include a Group I element, a Group II element, or both. More particularly, the amorphous phase can include an oxide of a Group I element (e.g., sodium oxide), a Group II oxide, or a combination thereof. In some other particular applications, the amorphous phase can include an alumina, cryolite, or a combination thereof.

In an embodiment, a coating can be provided to the bulk material to form the ceramic liner including the amorphous phase. In a particular embodiment, the coating can be provided to the bulk material by a lining form. More particularly, the coating can be transferred from a coated lining form to the bulk material.

In an embodiment, the outer surface of a lining form can be coated by painting, spraying, gunning, or the like, as desired by a skilled artisan. For coating large lining forms, spraying or gunning may be used for ease of handling. In another embodiment, a two-part spray or gun system can be used with a dual-component solution. In a particular embodiment, the dual-component solution can include the alkali and acidic solutions disclosed herein. In a further embodiment, the alkali and acidic solutions can be combined at the nozzle of a two-part spray/gun system and react to form a product, which is sprayed onto the outer surface and solidifies upon contact with the form.

In an embodiment, the alkali and acidic solutions can be combined at various volume ratios to for the reaction to take place and formation of the product. In an embodiment, the speed of the reaction and drying rate of the product can be affected by the volume ratio of the alkali and acidic solutions. In an embodiment, the volume ratio of the acidic solution to alkali solution can be at least 1:1 and at most 10:1 to allow the reaction to take place at a proper speed and help to prevent excessive spray.

Many lining forms are applicable in embodiments herein, and the invention is not limited to any particular lining form. The lining form can be made of a material known to a skilled artisan, such as a metal or a ceramic material. Exemplary metal material can include a metal element or an alloy, such as steel.

In an embodiment, the coating on the outer surface can have a thickness at least 2.5 mm to allow the coating to be continuous. For example, the coating can have a thickness of at least 3 mm or at least 4 mm. In another embodiment, the coating can have a thickness at most 10 mm to prevent the coating from flaking off, such as at most 8.8 mm or at most 7 mm. Thickness of the coating may be adjusted to allow sufficient coating to be provided on the bulk material. In a further embodiment, the coating can have a thickness in a range including at least 2.5 mm and at most 10 mm, such as in a range including at least 4 mm and at most 7 mm.

In an embodiment, the coated lining form can be placed in a furnace using suitable tools and methods known to a skilled artisan so that the form can be centered for its entire length and spacing between the form and furnace wall can be uniform along the circumference of the form. In a further embodiment, dry bulk material in the powder form can be introduced into the spacing and compacted using techniques known to a skilled artisan. In an embodiment, the bulk material powder can have a suitable average particle size known to a skilled artisan, such as at least 45 microns and at most 3200 microns. In another embodiment, the bulk material can be dry and vibratable. In a particular embodiment, the bulk material can be in contact with the coating on the outer surface of the lining form. In another particular embodiment, the coating can include a sintering aid.

Figure 4:
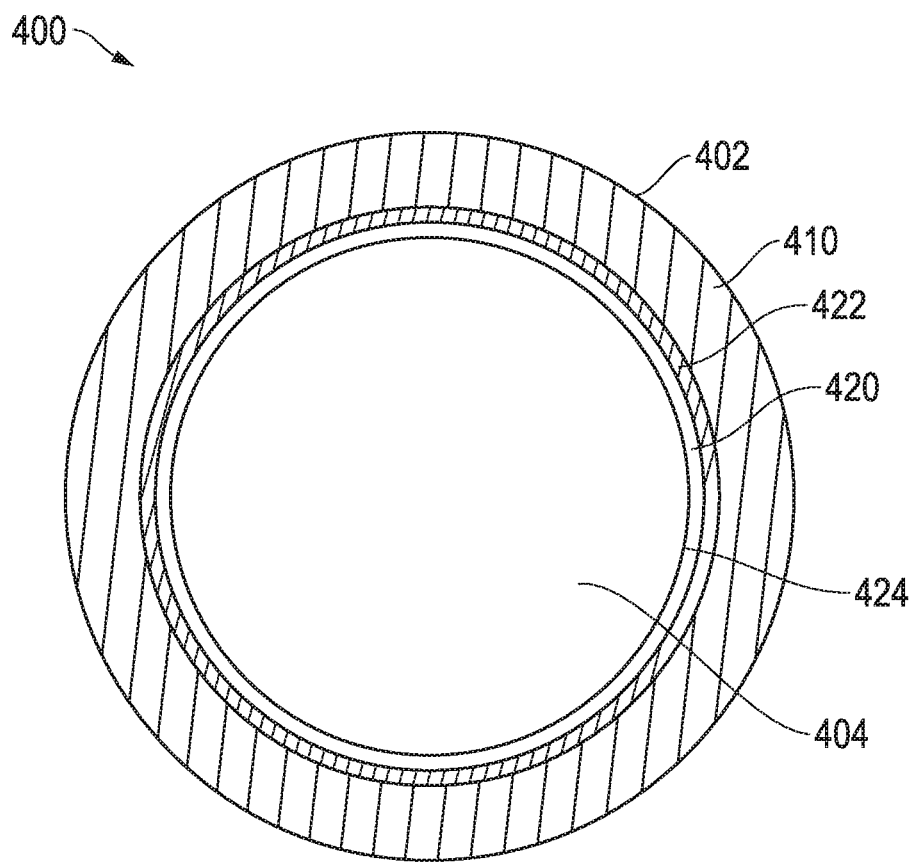
FIG. 4 includes a top view of a furnace in accordance with an embodiment herein.

FIG. 4 includes an illustration of a top view of a furnace 400. A bulk material 410 is placed between a furnace wall 402 and a lining form 420. The lining form has a coating 422 on an outer surface of the form (not illustrated), and the coating 422 abuts the bulk material 410. An inner surface 424 of the form 420 faces a cavity 404 of the furnace 400.

In an embodiment, prior to application of heat, the bulk material can have a porosity at most 17 vol % for a total volume of the bulk material after installation, such as at most 15 vol % or at most 13 vol %, to facilitate formation of a ceramic liner having desired density. In another embodiment, the bulk material can have a porosity at least 7 vol %, such as at least 9 vol %, as porosity of the bulk material may be affected by the installation process (e.g., compacting). It is to be understood, after installation, the bulk material can have a porosity in a range including at least 7 vol % and at most 17 vol % for a total volume of the bulk material, such as in a range including at least 9 vol % and at most 15 vol %.

In another embodiment, an initial heat can be applied to the coated form and the bulk material, using techniques known to a skilled artisan, such as torch, electrical power, or both. In a further embodiment, the initial heat can be sufficient to transfer at least a portion of the coating to the bulk material. In an embodiment, at least 30 vol % for a total volume of the coating or a majority of the coating can be transferred to the bulk material to facilitate formation of the ceramic liner. In a particular embodiment, the initial heat can be sufficient to transfer at least 70 vol %, at least 90 vol %, or at least 95 vol % of the coating to the bulk material. In another embodiment, coating residuals may be left on the form after the first heat is completed. For example, less than 5 vol %, less than 2 vol %, or less than 0.7 vol % of the coating may be left on the form, as transfer may be affected by heating time, temperature, and initial thickness of the coating.

In another embodiment, the initial heat can be sufficient to soften at least a portion of the coating so that at least a portion of the coating can flow into pores within the bulk material. In still another embodiment, pores within at most 50% of the thickness of the bulk material may be filled with the coating. In a particular embodiment, pores that are within at most 30%, at most 20%, or at most 15% of the thickness of the bulk material can be filled with the coating. In another embodiment, the coating may not reach a pore that is localized deeper than 60%, deeper than 50%, or deeper than 30% of the thickness of the bulk material. In another embodiment, at least a portion of the coating can adhere to the bulk material without going into pores within the bulk material.

In an embodiment, the initial heat can be performed at a certain temperature. The temperature can be lower than the melting temperature of the lining form, the sintering temperature of the bulk material, or both. In a further embodiment, the initial heat can be sufficient for the coating to react with the bulk material and allow localized sintering reaction to take place. In a particular embodiment, the sintering reaction can be limited within a surface portion of the bulk material that is filled with the coating, such that the surface portion of the bulk material can be sintered in the initial heat, while the bulk portion can be unsintered.

Figure 5:
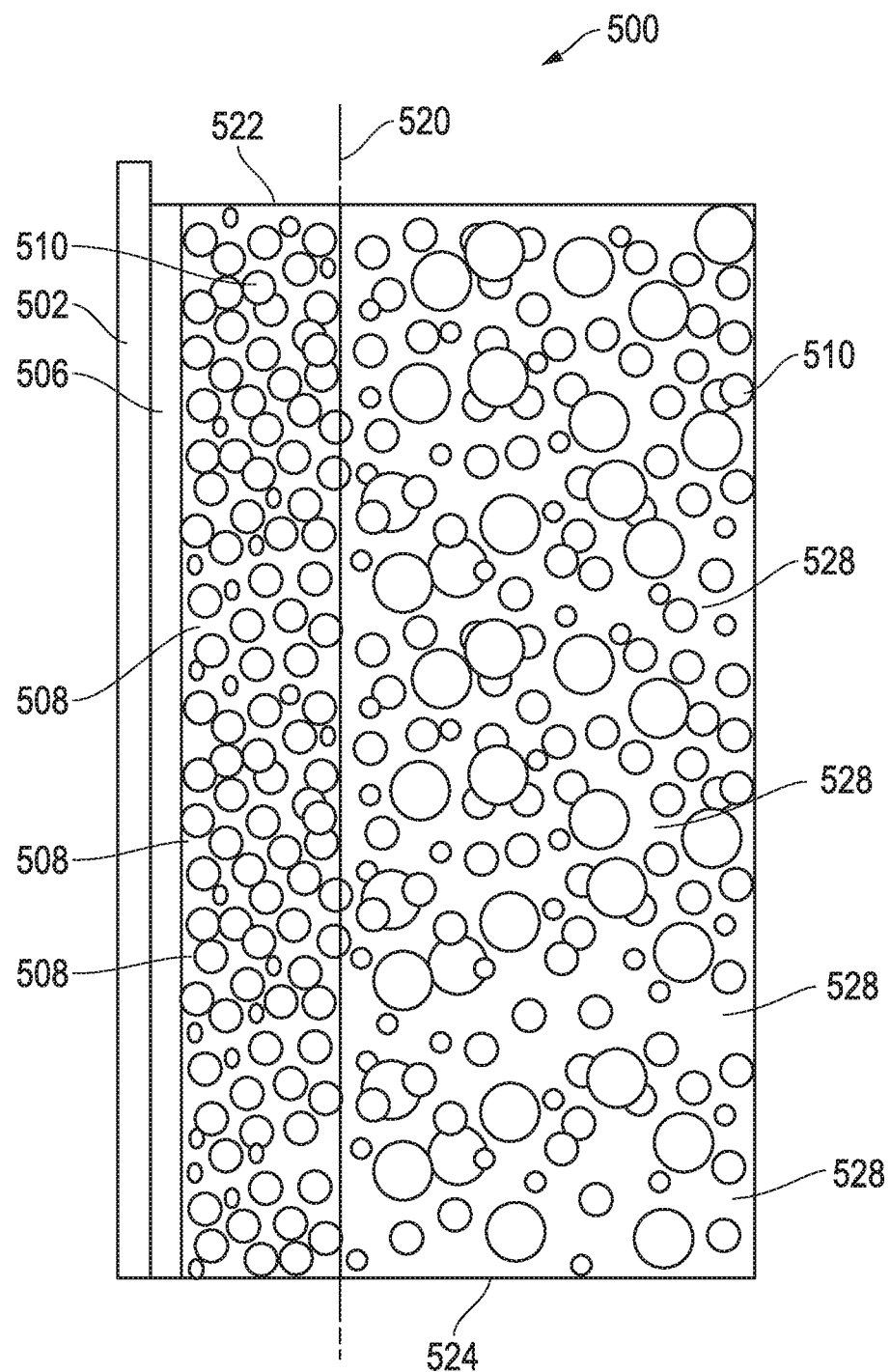
FIG. 5 includes an illustration of a cross-sectional view of a portion of a furnace including a lining form and a lining material in accordance with an embodiment herein.

FIG. 5 includes an illustration of a cross-sectional view of a portion of a furnace 500 in the initial heat. As illustrated, a lining form 502 has a coating 506 in contact with the surface portion 522 that includes the bulk material having grains 510. An artificial line 520 is included to demonstrate locations of the surface portion 522 and bulk portion 524. The bulk portion 524 include the same bulk material as the surface portion. The bulk material can have various grain sizes, and the average grain sizes in the surface portion and the bulk portion can be the same prior to the initial heat. As illustrated, the coating 506 has entered into the surface portion 522 and takes up at least some of the spaces between grains. In a particular embodiment, all of the spaces within the surface portion can be occupied by the coating. In the initial heat, a discontinuous amorphous phase 508 is being formed in the spaces within the surface portion 522. The bulk portion 524 remains unsintered, and air is trapped (e.g., pores 528) between the grains 510. The bulk portion 524 can have a low porosity. In an embodiment, the bulk portion 524 can have a porosity resulted from compacting the refractory powder. In a particular embodiment, the coating may not enter the bulk portion 524.

In an embodiment, the initial heat can be at a temperature of at least 500° C., such as at least 650° C. or at least 800° C. to allow transfer of the coating, sintering of the surface portion, or both. In another instance, the initial heat can be at a temperature of at most 1200° C., such as at most 1150° C. or at most 1050° C. to be below the melting temperature of the lining form. In a further embodiment, the initial heat can be at a temperature in a range including any of the minimum and maximum temperatures noted herein. For example, the temperature can be in a range including at least 500° C. and at most 1200° C. The initial heat can be at different temperatures for applications using different coatings. For instance, when boric acid is used, the first temperature can be in a range from 800° C. to 860° C. However, when aluminum fluoride is used, the first temperature can be in a range from 950° C. to 1000° C. A skilled artisan would be able to determine a suitable temperature for applying the initial heat after reading this disclosure. In a further embodiment, the furnace can be heated at a rate of at least 90° C./hr and at most 1000° C./hr to reach the desired temperature for the initial heat. In a particular embodiment, as desired, the heating rate can be at least 90° C./hr and at most 500° C./hr. If the heating rate is too high, strength of the form may be compromised, and the form may tear. The heating rate can be determined according to the furnace design, such as capacity and materials of a furnace, and operation conditions.

In a further embodiment, heating at the first temperature can be performed for at least 20 minutes, such as at least 40 minutes or at least an hour or even longer to allow transfer of the coating to complete and adequate depth of the bulk material to sinter. In another embodiment, the first heat can last at most 6 hours, such as at most 4 hours, or at most 3 hours. Heating time of the initial heat may vary according to compositions of the bulk material and coating and the heating temperature. In a further embodiment, the initial heat can be applied for a time period in a range including any of the minimum and maximum values disclosed herein. For instance, the first heat can last for at least 20 minutes and at most 6 hours.

In an embodiment, after the initial heat, the surface portion and the bulk portion can have a different porosity. In an embodiment, after the initial heat, the surface portion can be sintered. In another embodiment, after the initial heat, the surface portion can have a porosity of at most 5 vol % for the total volume of the surface portion, such as at most 2 vol % or at most 0.5 vol %, as the porosity may be affected by the extent of the sintering reaction and heating conditions. In another embodiment, the porosity of the surface portion can be greater than 0 after the initial heat. In a further embodiment, after the initial heat, the bulk portion can remain unsintered. In a further embodiment, after the initial heat, the bulk portion can have a porosity of at least 7 vol %, such as at least 9 vol %, of the total volume of the bulk portion, as the porosity may be affected by the installation process (e.g., compacting). In another embodiment, the bulk material can have a porosity of at most 17 vol % for a total volume of the bulk portion, such as at most 15 vol % or at most 13 vol %, to facilitate formation of a ceramic liner having desired density.

In an embodiment, if desired, the lining form can be removed after the first heat is completed. In an embodiment, the furnace can be cooled down to at most 200° C. for safety concerns and to allow the lining form to be pulled away from the bulk material. In another embodiment, lower temperatures may facilitate separation from the bulk material due to shrinkage of the form. For instance, the furnace can be cooled down to at most 120° C. or at most 60° C. In an embodiment, the furnace can be allowed to cool down by just turning off the heat, or use of a tool (e.g., a fan) to speed up cooling as desired. In a further embodiment, a cooling rate may be applied based on the desired time for cooling, availability of tools and furnace designs. For instance, a cooling rate can be at least 400° C./hr or at least 800° C./hr to shorten the cooling time. In another instance, a higher cooling rate, such as 1600° C./hr, may be desired to accelerate metal production. After reading this disclosure, a skilled artisan would be able to determine a proper cooling rate to suit an application. In a further embodiment, the lining form may be cleaned and coated as disclosed herein for reuse in liner installation. In another embodiment, the lining form may be kept in the furnace and allowed to melt in subsequent heat.

In an embodiment, a subsequent heat can be applied to the bulk material and the coating. The subsequent heat can be applied before or after the furnace is charged with metal. In a particular embodiment, the subsequent heat can be sufficient to sinter the bulk material. In another particular embodiment, the subsequent heat can be sufficient to melt the charge of metal. In some instances, it may be desired to fully sinter the liner before the furnace is charged with metal. In an embodiment, the furnace can be heated up at a rate of at least 100° C./hr and at most 200° C./hr to allow sufficient time for the sintering reaction to take place. In instances that the furnace is charged prior to formation of a fully sintered liner, the heating rate can be at least 100° C./hr and at most 500° C./hr to reach the proper melting temperature. In some applications, the liner can become fully sintered after a couple of or more operations of melting metal.

In an embodiment, the subsequent heat can be performed at a temperature of at least 1200° C., such as at least 1200° C., or at least 1400° C. In another instance, the subsequent heat can be at a temperature of at most 1650° C., such as at most 1500° C., or at most 1450° C. The temperature may vary according to compositions of the bulk material and melting temperatures of metal. In a particular embodiment, the subsequent heat temperature can be higher than the initial heat temperature.

In an embodiment, the subsequent heat can be performed for a suitable time to allow the bulk material to fully sinter, the charge of metal to melt, or both. In an embodiment, the subsequent heat can be performed for at least 1 hour, such as at least 2.5 hours, or at least 4 hours. In another embodiment, the second heat can be performed for at most 12 hours, such as at most 10 hours or at most 8 hours. The subsequent heating time may vary depending on the material and thickness of the bulk material and desired heating temperature. The subsequent heat can be performed for a time period in a range including any of the minimum and maximum values noted above. In an embodiment, after the subsequent heat is completed, molten metal can be removed as needed, and the furnace can be cooled down for a second operation.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A ceramic liner, comprising a monolithic body including:
  a surface portion including an inner surface of the monolithic body and having a thickness less than a total thickness of the monolithic body; and a bulk portion,
wherein:
   the surface portion comprises an amorphous phase embedded within the surface portion; and
   the bulk portion is substantially free of an amorphous phase.

Embodiment 2. A ceramic liner, comprising a monolithic body comprising a discontinuous amorphous phase, wherein at least 50% of the discontinuous amorphous phase resides within a surface portion of the monolithic body, wherein the surface portion includes an inner surface of the monolithic body and having a thickness at most 90% of a total thickness of the monolithic body.

Embodiment 3. A method of forming a ceramic liner, comprising;
   providing a furnace with a coating and a bulk material of the ceramic liner; and
   heating the bulk material and the coating to form the ceramic liner having a monolithic body,
   wherein the monolithic body comprises a surface portion and a bulk portion, the surface portion including an inner surface of the monolithic body and having a thickness less than a total thickness of the monolithic body; and
   wherein the surface portion comprises an amorphous phase embedded within the surface portion and the bulk portion is substantially free of an amorphous phase.

Embodiment 4. A method of forming a ceramic liner, comprising;
   placing a form having a coating in a furnace;
   introducing a bulk material into a space between a wall of the furnace and the form having the coating;
   heating the bulk material and the form having the coating at a first temperature, wherein the first temperature is sufficient to transfer at least a portion of the coating to the bulk material; and
   removing the form from the furnace.

Embodiment 5. The method of embodiment 4, further comprising heating the bulk material and the coating at a second temperature after removing the form, wherein the second temperature is sufficient to sinter the bulk material.

Embodiment 6. The method of embodiment 5, wherein the ceramic liner includes a monolithic body having an amorphous phase.

Embodiment 7. The method of embodiment 6, wherein the amorphous phase is within a surface portion of the monolithic body, wherein the surface portion has a thickness less than a total thickness of the ceramic liner.

Embodiment 8. The method of any one of embodiments 4 to 6, further comprising spraying the coating onto the form.

Embodiment 9. The method of embodiment 8, wherein spraying is performed with a dual-component solution.

Embodiment 10. The method of embodiment 9, wherein the dual-component solution comprises a silicate solution.

Embodiment 11. The method of embodiment 10, wherein the silicate comprises an element selected from the group consisting of Group I and Group II elements.

Embodiment 12. The method of any one of embodiments 9 to 11, wherein the dual-component solution comprises a sodium silicate solution, a potassium silicate solution, or a combination thereof.

Embodiment 13. The method of any one of embodiments 9 to 11, wherein the dual-component solution comprises a solution including aluminum phosphate, aluminum fluoride, or a combination thereof.

Embodiment 14. The method of any one of embodiments 9 to 11, wherein the dual-component solution comprises an acidic solution.

Embodiment 15. The method of embodiment 14, wherein the acidic solution comprises boric acid, citric acid, or a combination thereof.

Embodiment 16. The method of any one of embodiments 3 to 14, wherein the coating has a thickness from at least 2.5 mm to at most 10 mm.

Embodiment 17. The method of any one of embodiments 4 to 15, wherein the first temperature is at least 500° C. to at most 1200° C.

Embodiment 18. The method of any one of embodiments 4 to 16, wherein heating at the first temperature is performed for at least 20 minutes to at most 6 hours.

Embodiment 19. The method of embodiment 3, wherein before heating, the bulk material has a porosity of 9 vol % to 15 vol % for a total volume of the bulk material.

Embodiment 20. The method of any one of embodiments 4 to 17, wherein before heating at the first temperature, the bulk material has a porosity of 9 vol % to 15 vol % for a total volume of the bulk material.

Embodiment 21. The method of any one of embodiments 3 to 20, wherein at least 90 vol % of the coating relative to a total volume of the coating is transferred to the bulk material.

Embodiment 22. The method of any one of embodiments 3 to 21, wherein at least 95 vol % of the coating relative to a total volume of the coating is transferred to the bulk material.

Embodiment 23. The method of any one of embodiments 4 to 18 and 20 to 22, wherein introducing the bulk material comprises compacting the bulk material within the space such that the bulk material has a porosity of at most 15 vol %.

Embodiment 24. The method of any one of the embodiments 4 to 21, wherein after heating at a second temperature, the amorphous phase is at most 15 vol % of the monolithic body.

Embodiment 25. The method of any one of the embodiments 4 to 22, wherein after heating at a second temperature, the monolithic body has a porosity of at most 2 vol %, at most 1 vol %, or at most 0.4 vol %.

Embodiment 26. The method of any one of embodiments 4 to 18 and 20 to 25, further comprising cooling the furnace to a temperature of at most 200° C., at most 120° C., or at most 60° C. prior to removing the form from the furnace.

Embodiment 27. The method of any one of embodiments 4 to 18 and 20 to 26, wherein removing the form from the furnace is performed before heating at the second temperature.

Embodiment 28. The ceramic liner or the method of any one of embodiments 1 to 27, wherein the ceramic liner comprises an alumina, a magnesia, or a combination thereof.

Embodiment 29. The ceramic liner or the method of any one of embodiments 1, 2, 3, and 6 to 28, wherein the amorphous phase comprises a silica.

Embodiment 30. The ceramic liner or the method of any one of embodiments 1, 2, 3, and 6 to 29, wherein the amorphous phase comprises one or more elements selected from a group consisting of Group I and Group II elements.

Embodiment 31. The ceramic liner or the method of any one of embodiments 1, 2, 3, and 6 to 30, wherein the amorphous phase comprises a sodium oxide.

Embodiment 32. The ceramic liner or the method of any one of embodiments 1, 2, 3, and 6 to 31, wherein the amorphous phase comprises an alumina, a cryolite, or a combination thereof.

Embodiment 33. The ceramic liner or the method of any one of embodiments 1, 2, 3, and 6 to 32, wherein the amorphous phase comprises a borosilicate.

Embodiment 34. The ceramic liner of any one of embodiments 1, 3, and 6 to 33, wherein the monolithic body comprises a discontinuous amorphous phase residing in the surface portion.

Embodiment 35. The ceramic liner or the method of embodiment 2 or 34, wherein at least 70% or at least 90% of the discontinuous amorphous phase resides in the surface portion.

Embodiment 36. The ceramic liner or the method of any one of embodiments 2, 34, and 35, wherein a discrete amorphous member of the amorphous phase within the monolithic body is spaced apart from an inner surface of the monolithic body.

Embodiment 37. The ceramic liner or the method of any one of embodiments 1, 2, 3, and 5 to 36, wherein the ceramic liner has a content of the amorphous phase from at least 0.2 vol % to at most 15 vol % of the monolithic body.

Embodiment 38. The ceramic liner or the method of any one of embodiments 1, 2, 3, and 7 to 37, wherein the surface portion has a thickness at most 40 mm, at most 25 mm, or at most 15 mm.

Embodiment 39. The ceramic liner or the method of any one of embodiments 1, 2, 3, and 7 to 38, wherein the thickness of the surface portion is at most 50%, or at most 30%, or at most 15% of the total thickness of the monolithic body.

Embodiment 40. The ceramic liner or the method of any one of embodiments 1, 2, 3, and 7 to 39, wherein the thickness of the surface portion is at least 0.2% of the total thickness of the monolithic body.

Embodiment 41. The ceramic liner or the method of any one of embodiments 1, 2, 3, and 6 to 40, wherein the monolithic body has a thickness of at least 75 mm, at least 110 mm, or at least 140 mm.

Embodiment 42. A furnace, comprising the ceramic liner of any one of embodiments 1, 2, 3, and 28 to 41 or made by the method of any one of embodiments 3 to 41.

EXAMPLE 1

Acidic solutions 1 and 2 were prepared with $H_2O$, having Compositions 1 and 2, respectively, as disclosed in Table 1. A silicate solution was prepared including 25 wt % to 35 wt % of sodium silicate. Steel forms were coated using a two-part spray system with the silicate solution and Solution 1 or the silicate solution and Solution 2. The solutions were combined at a volume ratio of 1:1 for each coating. The coatings had thickness of approximately 3.2 mm.

TABLE 1

| Components | Composition 1 (wt. %) | Composition 2 (Wt. %) |
| --- | --- | --- |
| Boric Acid Anhydrous | 40-60 | 0 |
| #6 Tenn. Clay | 30-50 | 10-40 |
| Lignosol A | 2-12 | 10-30 |
| Alumina | 5-35 | 0-30 |
| Citric Acid | 0 | 10-30 |
| Cryolite | 0 | 25-50 |
| Polymeric Dispersant | 0-1 | 0.20-1 |

The present embodiments represent a departure from the state of the art. Metal lining forms typically have melting temperatures lower than sintering temperatures of liner refractory materials. After refractory powder is installed, a first heat is generally applied to sinter the refractory materials, which cause metal forms to melt. In metal production for applications in aerospace, medical, and other superalloy instances, metal forms are contaminants and required to be washed out prior to melting superalloy, such as using a heat cycle with a load of suitable molten metal. This additional wash step reduces the total heat cycles a furnace can run (e.g., reduction by 40%), and thus, significantly decreases furnace efficiency. Using sintering aids to lower sintering temperatures of refractory materials may cause reduction of liner service life, because sintering aids adversely impact refractory property of liners, rendering liners more susceptible to erosion and corrosion at operation temperatures. The ceramic liner and methods of embodiments herein provide a liner with improved service life, and may be particularly suitable for superalloy production, because melting metal forms can be avoided and distribution of a sintering aid is limited to the surface portion of a liner, minimizing the overall adverse effect on refractory property of the liner. In addition, metal forms can be reused as desired to reduce cost of metal production.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implement using digital circuits, and vice versa.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method of forming a ceramic liner, comprising;
placing a form having a coating in a furnace;
providing the furnace with the coating and a bulk material of the ceramic liner, wherein the bulk material is between a wall of the furnace and the form having the coating;
heating the bulk material and the coating to form the ceramic liner having a monolithic body, wherein heating the bulk material and the coating comprises heating the bulk material and the coating at a first temperature, wherein the first temperature is at least 500° C. to at most 1200° C. and sufficient to transfer at least a portion of the coating to the bulk material; and
removing the form from the furnace after heating the bulk material and the coating at the first temperature,
wherein the monolithic body comprises a surface portion and a bulk portion, the surface portion including an inner surface of the monolithic body and having a thickness less than a total thickness of the monolithic body; and
wherein the surface portion comprises an amorphous phase embedded within the surface portion and the bulk portion is substantially free of an amorphous phase.

2. The method of claim 1, wherein heating the bulk material and the coating further comprises heating the bulk material and the coating at a second temperature after removing the form, wherein the second temperature is sufficient to sinter the bulk material.

3. The method of claim 2, wherein the second temperature is at least 1200° C. to at most 1650° C.

4. The method of claim 1, wherein the first temperature is sufficient to sinter a portion of the bulk material to form the surface portion of the monolithic body.

5. The method of claim 4, wherein the bulk portion is not sintered after heating the bulk material and the coating at the first temperature.

6. The method of claim 1, wherein heating at the first temperature is performed for at least 20 minutes to at most 6 hours.

7. The method of claim 1, further comprising spraying the coating onto the form, wherein spraying is performed with a dual-component solution.

8. The method of claim 7, wherein the dual-component solution comprises a silicate solution.

9. The method of claim 7, wherein the dual-component solution comprises a solution including aluminum phosphate, aluminum fluoride, or a combination thereof.

10. The method of claim 7, wherein the dual-component solution comprises an acidic solution including boric acid, citric acid, or a combination thereof.

11. The method of claim 1, wherein the ceramic liner comprises an alumina, a magnesia, or a combination thereof.

12. The method of claim 1, wherein the amorphous phase comprises silica, one or more elements selected from a group consisting of Group I and Group II elements, an alumina, a cryolite, or a combination thereof.

13. The method of claim 1, wherein the amorphous phase is discontinuous, wherein a discrete amorphous member of the amorphous phase is embedded within the surface portion and is spaced apart from the inner surface of the monolithic body.

* * * * *

UNITED STATES PATENT AND TRADEMARK OFFICE
CERTIFICATE OF CORRECTION

PATENT NO. : 10,295,260 B2  
APPLICATION NO. : 15/787573  
DATED : May 21, 2019  
INVENTOR(S) : John Carl Walsh et al.

Page 1 of 1

It is certified that error appears in the above-identified patent and that said Letters Patent is hereby corrected as shown below:

On the Title Page

Page 2, item (56), U.S. Patent Documents, please delete "Amaguchi et al." and insert --Hamaguchi et al.--

Signed and Sealed this  
Fifteenth Day of June, 2021

Drew Hirshfeld  
*Performing the Functions and Duties of the  
Under Secretary of Commerce for Intellectual Property and  
Director of the United States Patent and Trademark Office*